United States Patent
Jae-Bong et al.

(10) Patent No.: US 7,467,786 B2
(45) Date of Patent: Dec. 23, 2008

(54) NEBULIZER FOR ULTRASONIC HUMIDIFIER

(75) Inventors: Jeung Jae-Bong, Busan (KR); Jung Dong-Min, Kyungnam (KR)

(73) Assignees: Wooritec Co., Ltd., Kyungnam (KR); Dobot Electronics, Ltd., Kyungnam (KR)

( * ) Notice: Subject to any disclaimer, the term of this patent is extended or adjusted under 35 U.S.C. 154(b) by 367 days.

(21) Appl. No.: 11/391,656

(22) Filed: Mar. 27, 2006

(65) Prior Publication Data

US 2007/0007673 A1   Jan. 11, 2007

(30) Foreign Application Priority Data

Jul. 6, 2005   (KR) ............... 10-2005-0060843

(51) Int. Cl.
  *B01F 3/04* (2006.01)
(52) U.S. Cl. ................. 261/81; 261/DIG. 48
(58) Field of Classification Search ............ 261/81, 261/DIG. 48, DIG. 65
  See application file for complete search history.

(56) References Cited

U.S. PATENT DOCUMENTS

| 4,113,809 | A | * | 9/1978 | Abair et al. ............. 261/81 |
| 4,746,466 | A | * | 5/1988 | Takahashi ............... 261/30 |
| 5,176,856 | A | * | 1/1993 | Takahashi et al. ......... 261/142 |
| 5,217,165 | A | * | 6/1993 | Takahashi et al. ........ 239/102.2 |
| 5,299,739 | A | | 4/1994 | Takahashi et al. |
| 5,464,572 | A | * | 11/1995 | Bonzi .................. 261/30 |
| 6,152,383 | A | | 11/2000 | Chen |
| 7,219,880 | B2 | * | 5/2007 | Huang et al. ............ 261/72.1 |
| 2004/0210151 | A1 | * | 10/2004 | Tsukashima et al. ....... 600/532 |
| 2005/0212152 | A1 | * | 9/2005 | Reens ................... 261/81 |

* cited by examiner

*Primary Examiner*—Scott Bushey
(74) *Attorney, Agent, or Firm*—DeLio & Peterson, LLC; Peter W. Peterson (57) ABSTRACT

Disclosed is a nebulizer mounted to an ultrasonic humidifier. In the nebulizer, a heat sink holder can be directly connected to one side of a bottom plate in the humidifier, by using a flange provided at the upper end portion of the heat sink holder to which a heat sink for irradiating the heat generated in a PCB outward is mounted. Further, a vibrator assembled with the heat sink can be easily separated and replaced, because the heat sink is stacked on and assembled with the heat sink holder. Furthermore, the size of the ultrasonic humidifier is reduced, because a water level sensor is assembled and integrated with the upper surface of the heat sink. Furthermore, the durability of a vibrator as well as the heat sink is improved, because the heat sink is made of brass coated with a nickel plating layer.

7 Claims, 6 Drawing Sheets

FIG. 1

PRIOR ART

FIG. 2

PRIOR ART

NEBULIZER FOR ULTRASONIC HUMIDIFIER

BACKGROUND OF THE INVENTION

1. Field of the Invention

The present invention relates to a nebulizer for an ultrasonic humidifier in which a heat sink assembled with a vibrator for nebulizing water for the ultrasonic humidifier is made of brass plated with nickel and a water level sensor is integrally assembled with the upper surface of the heat sink, so that the corrosion resistance of a heat sink is improved and the volume of the humidifier can be reduced.

2. Description of the Prior Art

A humidifier is a home appliance for maintaining pleasant interior surroundings by humidifying the dry interior air of a high temperature, especially, in the winter season. The humidifier is classified into a heating humidifier, an ultrasonic humidifier, a fan type humidifier, a hybrid type humidifier which uses advantages of the above-mentioned humidifiers, and the like.

The heating humidifier generates vapor by heating water with a heater or an electrode rod, the ultrasonic humidifier nebulizes water by vibrating a vibrator submerged in the water by using electrical signals of a predetermined frequency generated through an electric circuit, and the fan type humidifier transforms water into particles using wind generated when a fan installed on the water surface is rotated at a high rotational speed, in order to supply moisture into the air in their own ways.

Hereinafter, from among the humidifiers for humidifying the air in various ways as described above, a conventional ultrasonic humidifier will be described with reference to FIGS. 1 and 2.

Figure 1:
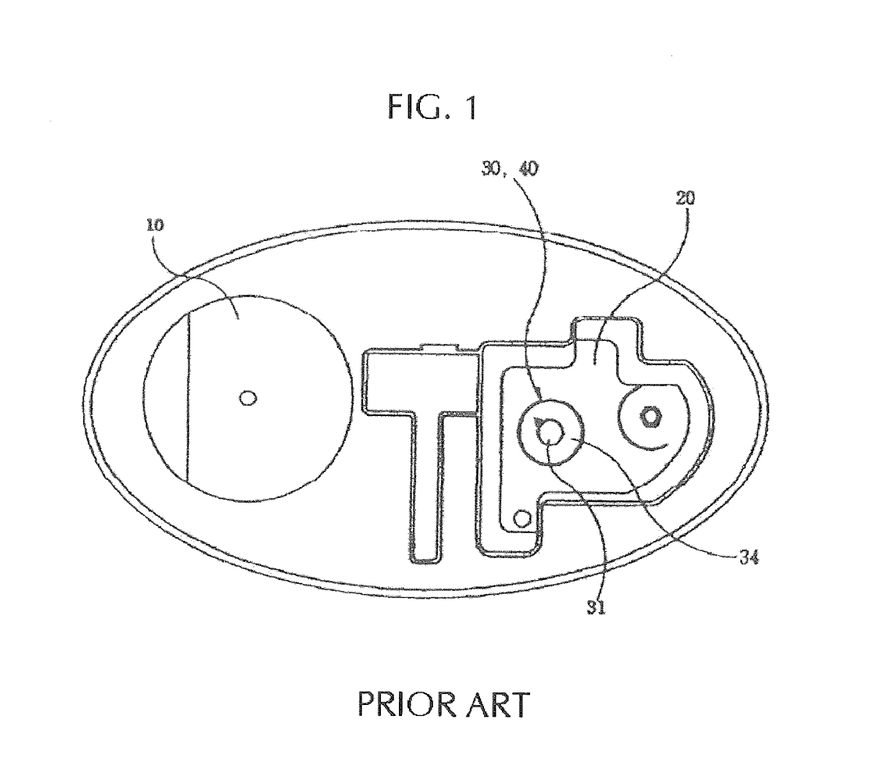
FIG. 1 is a plan view for showing a general ultrasonic humidifier from which a cover is separated.
Figure 2:
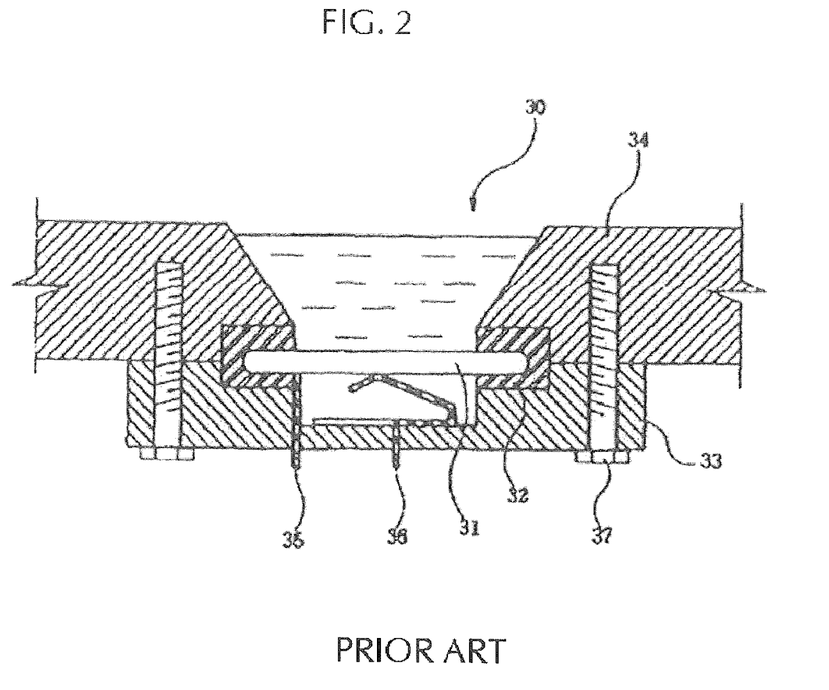
FIG. 2 is a schematic cross-sectional view for showing a nebulizer mounted to the ultrasonic humidifier of FIG. 1.

FIG. 1 is a plan view for showing a typical ultrasonic humidifier from which a cover is separated, and FIG. 2 is a schematic cross-sectional view for showing a nebulizer mounted to the ultrasonic humidifier of FIG. 1.

In the conventional ultrasonic humidifier as shown in the figures, the water filled in a water pail (not shown) of a water supplying portion 10 is introduced into a water tank 20 and an upper portion of a nebulizer 30 through a pipe, and, as mentioned above, the water introduced into the upper portion of the nebulizer 30 is nebulized by a vibrator 31 and then is supplied into the air to humidify the air.

The nebulizer 30 for nebulizing the water includes: a heat sink holder 33 having an upwardly opened recess at the central portion thereof and being located in a space between the bottom plate of the water tank 20 and the bottom plate of the outside of the humidifier; a heat sink 34 fixedly engaged with the heat sink holder 33 by a fixing means such as a bolt, with the heat sink stacked on the upper surface of the heat sink holder 33, the sink holder 33 having an upper surface attached to the bottom surface of the bottom surface of the water tank 20, the heat sink 33 having a penetration hole formed at the central portion thereof, the penetration hole having the center identical with the center of the recess of the heat sink holder 33; a guide ring 32 fixedly engaged with inner peripheral portions of the border between the heat sink holder 33 and the heat sink 34 staked on the heat sink holder 33; a disc-shaped vibrator 31 whose outer peripheral portion is fixedly engaged with the guide ring 32; and a connecting terminal 36 connecting the vibrator 31 and an ultrasonic oscillation circuit (not shown).

When the nebulizer is operated, heat is generated from a transistor of the ultrasonic oscillation circuit mounted directly under the heat sink holder 33, and the heat is transferred to the heat sink 34 through the heat sink holder 33 and a fixing means 37 and then is radiated outward, i.e., into the water.

The heat sink functioning as a final heat transferring medium, which radiates outward the heat generated in the ultrasonic oscillation circuit, is conventionally manufactured of an aluminum alloy coated with Teflon, which causes various problems, such as deterioration in the efficiency of the vibrator within a short time period.

Namely, since bubbles are generated not only in the vibrator but also on the surface of the heat sink during the operation of the humidifier, the surface of the heat sink of aluminum is easily corroded by the bubbles. Further, since aluminum chips exfoliated from the surface of the heat sink produce scales when combined with together with various components contained in the water and the scales are stuck to the surface of the vibrator, the efficiency of the vibrator is lowered and the vibrator is damaged. Therefore, the minute aluminum chips are discharged through a nebulizing nozzle together with vapor, thereby doing harm to human bodies.

Further, since water leakage toward the ultrasonic oscillation circuit side through a vibrator assembling portion is generated by the scales continuously accumulated on the surfaces of the heat sink and the vibrator, electrical short can be generated by the water, causing the entire nebulizer to be out of order.

Further, since the vibrator, which is one of consumption goods, is engaged with a guide ring fixed to inner peripheral portions of the border between the heat sink holder and the heat sink, it is necessary to disassemble the heat sink and the heat sink holder, after separating the entire outer bottom plate of the humidifier, in order to change the vibrator.

In addition, according to the ultrasonic humidifier, since the nebulizer and the water level sensor are separately installed, the number of parts is increased, thereby raising the manufacturing costs. Further, since too much area is necessary for installation of the nebulizer and the water level sensor, it is difficult to reduce the volume of the humidifier itself.

SUMMARY OF THE INVENTION

Accordingly, the present invention has been made to solve the above-mentioned problems occurring in the prior art, and an object of the present invention is to provide a nebulizer for an ultrasonic humidifier which can prolong the lifetime of a heat sink and a vibrator, can reduce the volume of the ultrasonic humidifier, and can easily replace a vibrator, by employing a heat sink of improved corrosion resistance and integrating a water level sensor with the heat sink.

It is another object of the present invention to provide a nebulizer for an ultrasonic humidifier which has an LED mounted to the upper surface of a heat sink to radiate light outward through a transparent or translucent cover, so that the nebulizer has an appealing appearance.

These objects are achieved by using an integrated structure including an assembling flange formed at the upper end of a heat sink, a heat sink made of brass, and a water level sensor.

A nebulizer for an ultrasonic humidifier according to the present invention is characterized in that the corrosion resistance thereof is improved and the ultrasonic humidifier can be easily cleaned by using the heat sink formed of brass and plated with nickel. Further, a nebulizer for an ultrasonic humidifier according to the present invention is characterized in that a water level sensor and an LED can be easily engaged by using a water tank assembling flange at the upper end portion of a holder for mounting the heat sink and thus completely exposing the upper surface of the heat sink to the outside. Furthermore, a nebulizer for an ultrasonic humidifier according to the present invention is characterized in that a vibrator is simply disassembled and changed with a water tank without separating a bottom plate of a humidifier, by inserting and assembling a vibrator guide, to which a vibrator is mounted, into and with a heat sink.

The nebulizer for the ultrasonic humidifier according to the present invention includes: a cylindrical heat sink holder in which a flange having a plurality of assembling holes is provided at an upper end portion of the heat sink holder so that the heat sink holder can be positioned on one side of the inner bottom plate directly under a nebulizing nozzle, the heat sink holder having an upwardly opened interior space R; a heat sink stacked on and assembled with the upper end portion of the heat sink holder, the heat sink having a vibrator guide receiving recess formed at a central portion of an upper surface of the heat sink; a PCB having a portion fixed to a bottom surface of the heat sink by means of an assembling member F such as a bolt, so that the PCB is located in an interior space of the heat sink holder, the PCB including an ultrasonic oscillation circuit; a cylindrical vibrator guide inserted in the vibrator guide receiving recess of the heat sink in such a manner that an outer cylindrical surface of the cylindrical vibrator guide is in close contact with an inner cylindrical surface of the vibrator guide receiving recess, the vibrator guide having a vibrator holding groove formed along an inner cylindrical surface of a cylindrical hole which extends vertically through a central portion of the vibrator guide; a disc-shaped vibrator received in the vibrator guide in such a manner that an entire outer circumferential portion of the disc-shaped vibrator is tightly inserted in the vibrator holding groove formed at the inner cylindrical surface of the vibrator guide; a guide fixing ring having a bottom surface in close contact with an upper surface of the vibrator guide and having an outer peripheral surface in close contact with an upper portion of the inner cylindrical surface of the vibrator guide receiving recess, so as to hold the vibrator guide; and an inverted U-shaped water level sensor having two legs inserted in and engaged with a pair of water sensor holes formed on the upper surface of the heat sink, the sensor being electrically connected to the PCB and being formed by coating an insulating material such as enamel on a copper wire or a brass wire.

According to the nebulizer, if ultrasonic signals generated in an ultrasonic oscillation circuit embedded in a PCB are transferred to a vibrator through a connecting wire, the vibrator nebulizes water while vibrating, and heat is generated from a transistor of a PCB in the process of generating the ultrasonic signals.

Therefore, it is a heat sink that is directed to prevent the PCB from being damaged by the heat, by irradiating the heat generated in the PCB outward. As mentioned above, it is preferable that the heat sink is formed of brass so that it enables prompt heat transfer and has corrosion resistance to water, bubbles, and impurities which may be contained in water. It is also preferable that a smooth nickel plating later is coated on the surface of the heat sink so that the impurities attached on the surface of the heat sink can be easily removed as the in-use time of the humidifier elapses.

Further, it is good for the appearance of the humidifier to allow the light irradiated from an LED assembled with the upper surface of the heat sink to be seen from outside of the humidifier, by assembling at least one LED with the upper surface of the heat sink exposed to the outside and by manufacturing an outer cover of the humidifier with a transparent or translucent material.

In the nebulizer according to the present invention, a vibrator guide is inserted into a vibrator guide receiving recess of the heat sink and then is fixed by a guide fixing ring. Differently from a conventional humidifier in which a heat sink and a heat sink holder are separately disassembled after the bottom plate of the humidifier is separated, the humidifier according to the present invention can separate the guide fixing ring from a heat sink without separation of the bottom plate of the humidifier, and can simply separate the vibrator guide, with which a vibrator is assembled, from the heat sink.

In addition, the nebulizer according to the present invention has a structural characteristic in that a water level sensor is integrally assembled with a heat sink. An inverted U-shaped water level sensor detects the level of the water in a manner in which the PCB detects the capacitance varied according to the submerged degree of the water level detecting sensor. If the water level drops below a predetermined portion of the water level sensor, detection signals stop the oscillation circuit of the PCB located in the heat sink holder and then stop the vibrator, and serves to display water shortage signals by flickering the LED on the outer surface of the humidifier.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

The object, technical constitution, operation, and effect of the present invention will be apparently understood by the following description with reference to the drawings showing a preferred embodiment of the present invention.

Figure 3:
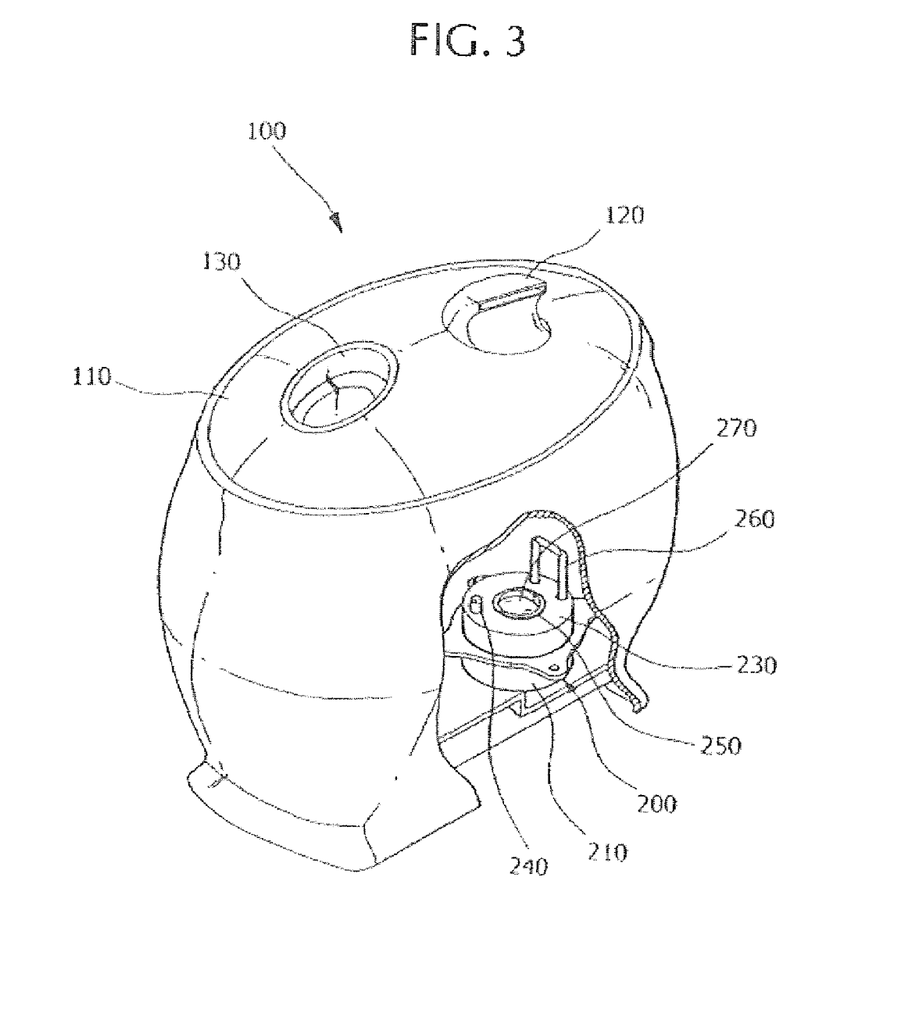
FIG. 3 is a partially cutaway perspective view for showing a humidifier employing a nebulizer for an ultrasonic humidifier according to a preferred embodiment of the present invention.
Figure 4:
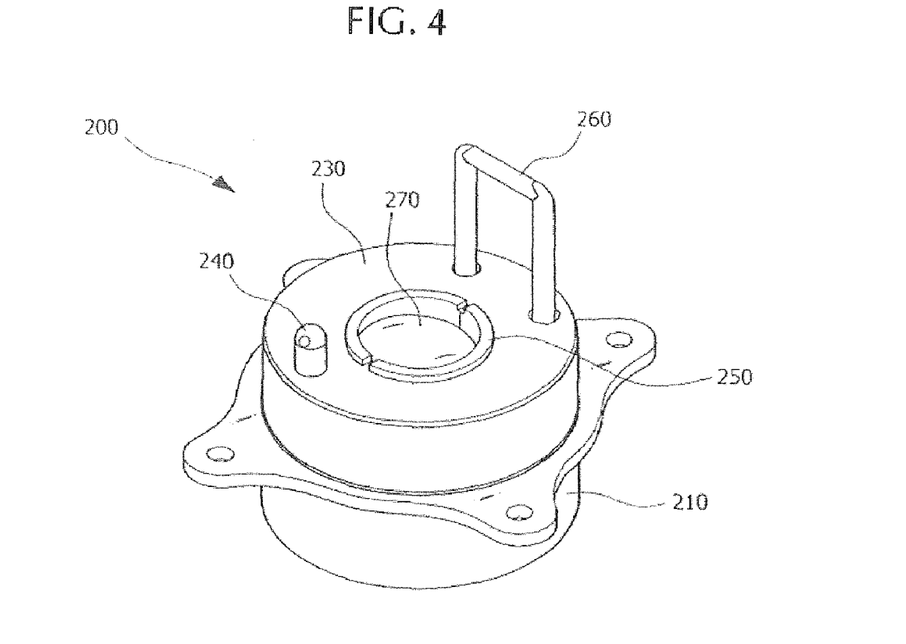
FIG. 4 is a perspective view for showing the nebulizer for the ultrasonic humidifier according to the preferred embodiment of the present invention.
Figure 5:
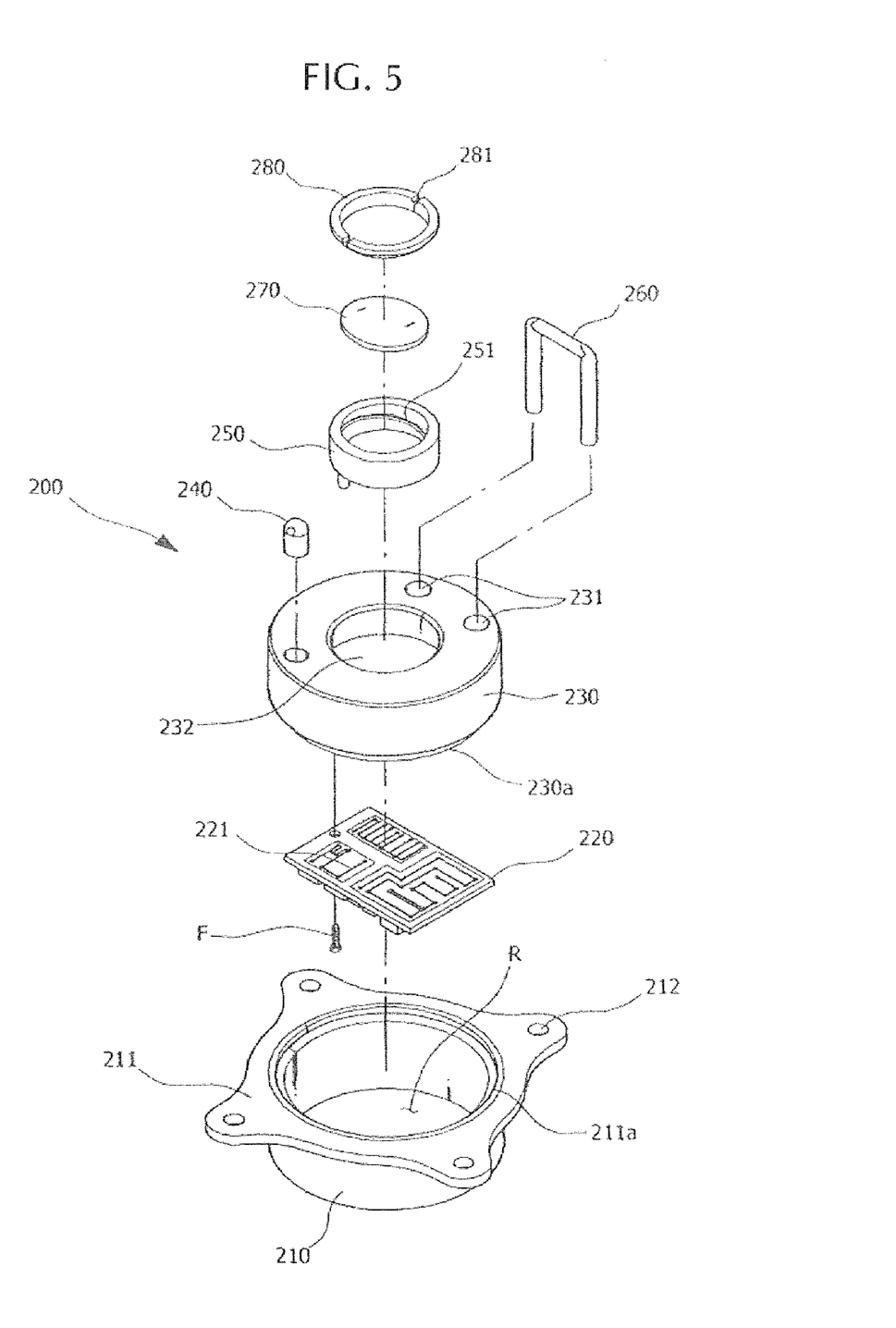
FIG. 5 is an exploded perspective view for showing the nebulizer for the ultrasonic humidifier according to the preferred embodiment of the present invention.
Figure 6:
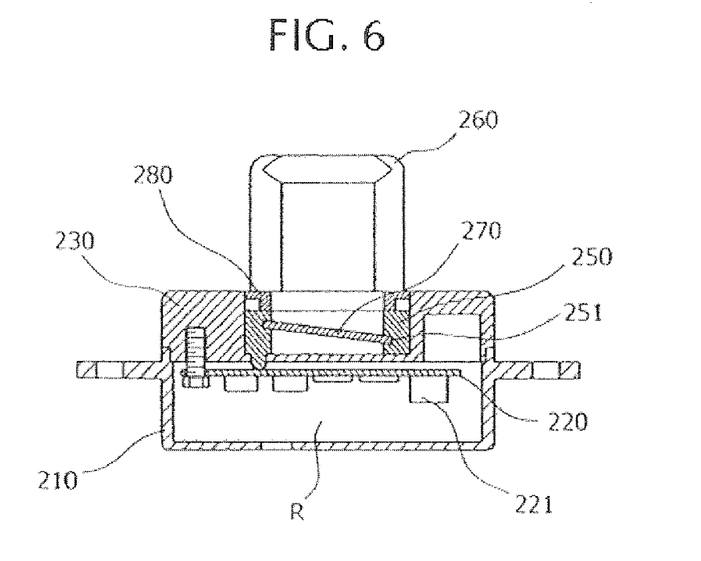
FIG. 6 is a cross-sectional view for showing the nebulizer for the ultrasonic humidifier according to the preferred embodiment of the present invention.

FIG. 3 is a partially cutaway perspective view for showing an ultrasonic humidifier employing a nebulizer according to a preferred embodiment of the present invention. FIG. 4 is a perspective view for showing the nebulizer according to the preferred embodiment of the present invention. FIG. 5 is an exploded perspective view for showing the nebulizer according to the preferred embodiment of the present invention. FIG. 6 is a cross-sectional view for showing the nebulizer according to the preferred embodiment of the present invention.

As shown in the figures, a nebulizer according to the present invention includes: a cylindrical heat sink holder 210 in which a flange 211 having a plurality of assembling holes 212 is provided at an upper end portion of the heat sink holder 210 so that the heat sink holder 210 can be positioned on one side of the inner bottom plate directly under a nebulizing nozzle 120, the heat sink holder 210 having an upwardly opened interior space R; a heat sink 230 stacked on and assembled with the upper end portion of the heat sink holder 210, the heat sink 230 having a vibrator guide receiving recess 232 formed at a central portion of an upper surface of the heat sink 230; a PCB 220 having a portion fixed to a bottom surface of the heat sink 230 by means of an assembling member F such as a bolt, so that the PCB 220 is located in an interior space of the heat sink holder 210, the PCB 220 including an ultrasonic oscillation circuit 221; a cylindrical vibrator guide 250 inserted in the vibrator guide receiving recess 232 of the heat sink 230 in such a manner that an outer cylindrical surface of the cylindrical vibrator guide 250 is in close contact with an inner cylindrical surface of the vibrator guide receiving recess 232, the vibrator guide 250 having a vibrator holding groove 251 formed along an inner cylindrical surface of a cylindrical hole which extends vertically through a central portion of the vibrator guide 250; a disc-shaped vibrator 270 received in the vibrator guide 250 in such a manner that an entire outer circumferential portion of the disc-shaped vibrator 270 is tightly inserted in the vibrator holding groove 251 formed at the inner cylindrical surface of the vibrator guide 250; a guide fixing ring 280 having a bottom surface in close contact with an upper surface of the vibrator guide 250 and having an outer peripheral surface in close contact with an upper portion of the inner cylindrical surface of the vibrator guide receiving recess 232, so as to hold the vibrator guide 250; and an inverted U-shaped water level sensor 260 having two legs inserted in and engaged with a pair of water sensor holes 231 formed on the upper surface of the heat sink 230 so that the water level sensor 260 stands erect.

Then, in order to stably stack the heat sink holder 210 and the heat sink 230, stepped portions 211a and 230a whose shapes correspond to each other are formed at the circumferential portion of the upper portion of the interior space R of the heat sink holder 210 and at the lower end portion of the heat sink 230, respectively.

Further, it is preferred that the upper portion of the inner cylindrical surface of the vibrator guide receiving recess 232 of the heat sink 230 is screw-coupled to the outer peripheral surface of the guide fixing ring 280 and at least one separation groove is formed on the upper surface of the guide fixing ring 280. By this structure, when it is necessary to replace the vibrator, it is possible to easily separate the guide fixing ring 280 from the vibrator guide receiving recess 232 of the heat sink 230 by simply rotating the guide fixing ring 280 by using the separation groove 281.

Further, it is also preferred that at least one LED 240 is provided at the upper surface of the heat sink 230 and the humidifier 100 has a cover 110 made of a transparent or translucent material, so that the light of the LED 240 can be radiated outward through the cover 110.

In addition, it is necessary to make the outer peripheral surface of the vibrator guide 250 be in completely tight contact with the inner cylindrical surface of the vibrator guide receiving recess 232 of the heat sink 230, to secure waterproof-ness between them. Simultaneously, it is preferred that it is possible to easily separate and replace the vibrator 270. To this end, it is preferred that the vibrator guide 250 is made of an elastic material having a proper strength, i.e., a highly elastic rubber having an excellent surface bonding force.

Hereinafter, the operation of the nebulizer according to the present invention will be described.

When electric power is supplied to the humidifier in a state where a water tank filled with water, ultrasonic signals are generated in an ultrasonic oscillation circuit 221 of the PCB 220 and are then transferred to the vibrator 270 through a connection wire (not shown) connecting the PCB 220 with the vibrator 270. The ultrasonic signals vibrate the vibrator 270 more than one million times per second, to generate ultrasonic waves. Then, the water in contact with the vibrator 270 is nebulized and dispersed in the air.

While the nebulizer continuously operates, if the water level of the water tank lowers below a predetermined water level, the water level sensor 260 detects such a descent of the water level. Then, the PCB 220 detects change of the capacitance by the water level sensor 260 and stops the ultrasonic oscillation circuit 221 and thus the operation of the vibrator 270.

As mentioned above, according to the nebulizer for the ultrasonic humidifier of the present invention, since the heat sink for cooling the PCB is formed of brass and then a smooth nickel plating layer is coated on the surface of the heat sink, the heat radiating efficiency and corrosion resistance of the heat sink is improved, thereby remarkably extending the lifetime of the heat sink.

Further, since the amount of scales, which are stuck to the surface of the vibrator by corrosive by-products, is remarkably reduced, the period for replacement of the vibrator is prolonged and costs for the maintenance and repair of the humidifier are reduced.

Further, since the cover of the humidifier is formed of a transparent or translucent material, the humidifier can be used as a decoration using the indirect illumination of the LED provided on the upper surface of the heat sink.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A nebulizer for an-ultrasonic humidifier, comprising:

a cylindrical heat sink holder in which a flange having a plurality of assembling holes is provided at an upper end portion of the heat sink holder so that the heat sink holder can be positioned on one side of the inner bottom plate directly under a nebulizing nozzle, the heat sink holder having an upwardly opened interior space (R);

a heat sink stacked on and assembled with the upper end portion of the heat sink holder, the heat sink having a vibrator guide receiving recess formed at a central portion of an upper surface of the heat sink;

a printed circuit board (PCB) having a portion fixed to a bottom surface of the heat sink by means of an assembling member (F) such as a bolt, so that the PCB is located in an interior space of the heat sink holder, the PCB including an ultrasonic oscillation circuit;

a cylindrical vibrator guide inserted in the vibrator guide receiving recess of the heat sink in such a manner that an outer cylindrical surface of the cylindrical vibrator guide is in close contact with an inner cylindrical surface of the vibrator guide receiving recess, the vibrator guide having a vibrator holding groove formed along an inner cylindrical surface of a cylindrical hole which extends vertically through a central portion of the vibrator guide;

a disc-shaped vibrator received in the vibrator guide in such a manner that an entire outer circumferential portion of the disc-shaped vibrator is tightly inserted in the vibrator holding groove formed at the inner cylindrical surface of the vibrator guide;

a guide fixing ring having a bottom surface in close contact with an upper surface of the vibrator guide and having an outer peripheral surface in close contact with an upper portion of the inner cylindrical surface of the vibrator guide receiving recess, so as to hold the vibrator guide; and an inverted U-shaped water level sensor having two legs inserted in and engaged with a pair of water sensor holes formed on the upper surface of the heat sink so that the water level sensor stands erect.

2. A nebulizer according to claim 1, wherein stepped portions whose shapes correspond to each other are formed at a circumferential portion of the upper portion of the interior space of the heat sink holder and at the lower end portion of the heat sink, respectively.

3. A nebulizer according to claim 1, wherein the heat sink is formed of brass and has a surface coated with a nickel plating layer.

4. A nebulizer according to claim 1, wherein the vibrator guide is formed of rubber.

5. A nebulizer according to claim 1, wherein at least one separation groove is formed on the upper surface of the guide fixing ring.

6. A nebulizer according to claim 1, wherein the water level sensor includes an insulation layer and one of a copper wire and a brass wire coated by the insulation layer, and has an inverted U shape.

7. A nebulizer according to claim 1, wherein at least one LED is additionally provided at the upper surface of the heat sink.

* * * * *